United States Patent [19]
Ludtke

[11] Patent Number: 6,154,206
[45] Date of Patent: Nov. 28, 2000

[54] METHOD AND APPARATUS FOR DISTRIBUTED CONDITIONAL ACCESS CONTROL ON A SERIAL COMMUNICATION NETWORK

[75] Inventor: Harold Aaron Ludtke, San Jose, Calif.

[73] Assignees: Sony Corporation of Japan, Tokyo, Japan; Sony Electronics, Inc., Park Ridge, N.J.

[21] Appl. No.: 09/232,019

[22] Filed: Jan. 14, 1999

Related U.S. Application Data

[60] Provisional application No. 60/084,511, May 6, 1998.
[51] Int. Cl.$^7$ ...................................................... H04N 7/10
[52] U.S. Cl. .......................... 345/327; 455/4.2; 348/5.5; 348/10
[58] Field of Search .................................. 348/10, 11, 12, 348/13, 5.5; 455/4.2, 5.1, 6.1, 6.2, 6.3; 345/327; 380/10, 20; 709/217, 218

[56] References Cited

U.S. PATENT DOCUMENTS

| 5,058,160 | 10/1991 | Banker et al. | 380/20 |
| 5,784,095 | 7/1998 | Robbins et al. | 348/6 |
| 5,990,927 | 11/1999 | Hendricks et al. | 348/10 |

FOREIGN PATENT DOCUMENTS

| 97/20432 | 6/1997 | WIPO | H04N 7/16 |

OTHER PUBLICATIONS

DVB Conditional Access, by David J. Cutts, Electronics & Communication Engineering Journal, Feb. 1997.

*Primary Examiner*—Victor R. Kostak
*Attorney, Agent, or Firm*—Wagner, Murabito & Hao LLP

[57] ABSTRACT

A method and apparatus for distributed conditional access (CA) control on a serial communication network. An exemplary embodiment of the present invention includes a CA subsystem over a 1394 network, the CA subsystem comprising a receiver unit for receiving a digital broadcast signal (DBS) and OOB data from an external source, where the DBS and OOB data are transmitted from the external source to the receiver unit in different broadcast frequencies. The receiver unit comprises a main tuner subunit coupled to receive the DBS, which can be encrypted with respect to a first encryption scheme. The receiver unit also comprises an OOB tuner subunit coupled to receive the OOB data for decrypting the DBS with respect to the first encryption scheme. The CA subsystem also comprises a CA control unit coupled to the receiver unit, which in turn comprises a CA subunit coupled to receive the DBS and OOB data. If the DBS is encrypted with respect to the first encryption scheme, the CA subunit generates a descrambled signal from the DBS using the OOB data, such that said descrambled signal is no longer encrypted with respect to the first encryption scheme. Other embodiments of the present invention include the above and wherein the descrambled signal is encrypted with respect to a standard 1394 copy protection scheme, but not encrypted with respect to the first encryption scheme.

32 Claims, 6 Drawing Sheets

METHOD AND APPARATUS FOR DISTRIBUTED CONDITIONAL ACCESS CONTROL ON A SERIAL COMMUNICATION NETWORK

The present application claims priority to the provisional application entitled "NCAM AV/C CTS Subunit" by Ludtke (Ser. No. 60/084,511; filed on May 6, 1998 pursuant to 35 U.S.C. §119(e); 37 C.F.R. §1.78.

BACKGROUND OF THE INVENTION

1. Field of the Invention

The present invention relates to the field of digital broadcasting. More specifically, the present invention relates to distributed conditional access (CA) on a serial communication network which supports digital cable broadcast systems.

2. Related Art

Television (TV) programming and other kinds of broadcast services are commonly available to the public via subscription from the respective providers, such as cable TV and satellite TV service providers. A viewing subscription typically includes certain basic services, such as programming from local TV stations, that are provided as part of the basic subscription. Additionally, the subscription may also include pay-per-view (PPV) programs, where the customer decides to pay for and watch and/or record a program such as a movie or a sports event spontaneously, that are not covered by the basic subscription fee. In order to implement appropriate access restrictions on individual customers according to their subscriptions, the broadcast signals are scrambled or encrypted, and an electronic set top box (STB) with specific descrambling capabilities is supplied by the service providers to each of their customers. Using the STB, each customer can then access the programming that he/she has paid for in unscrambled form. In the broadcasting art, the selective descrambling of broadcast signals is commonly referred to as conditional access (CA) control and the programming and other services that require such descrambling by the service recipients (e.g., PPV programs) are often called CA services.

To implement conditional access control, different programming contents carried by broadcast signals are typically encrypted using different encryption schemes. For example, the programming content of a PPV movie channel is usually encrypted differently from that of a PPV sports channel, such that a separate decryption scheme—and thus a separate authorization for payment, for example—is required to gain access to the descrambled content of each PPV channel. On the other hand, an STB is typically equipped with a few slots, each of which can accept a physical card, e.g., a PCMCIA card or a smart card. Each electronic card enables the STB to descramble or decrypt the contents of a limited number of channels. Thus, by providing their customers with the appropriate card(s) in the STBs based on their individual subscriptions, the service providers can control the programming contents that each customer is able to access accordingly.

As thus described, the CA mechanism is built into each STB in the prior art. Consequently, the cost of implementing the CA technology, such as the cost of PCMCIA electronics and connectors and of smart card readers, are incurred for each STB irrespective of whether the particular customer wants to have CA services or not. In other words, a substantial number of prior art STBs include extraneous components that unnecessarily inflate the unit cost of STBs for the service providers. Moreover, for those customers who subscribe to CA services, additional costs are incurred for the corresponding PCMCIA and/or smart cards. It would be advantageous to reduce the cost of the STB by avoiding the costs associated with the electronic component and cards.

Just as importantly, the prior art CA mechanism inherently limits the number of CA services that can be consumed (e.g., watching, recording) at a given time. This is because a prior art card-based STB is physically limited in size and can only accommodate a fixed number of PCMCIA and/or smart cards (as limited by the number of card slots in the STB), and each card typically can only descramble one or two services at a given time. Thus, the prior art CA mechanism does not work well in an environment having a large number of CA services (e.g., numerous TV channels), as is typical in a digital broadcasting environment, since too many cards would be required to handle the different CA services.

Thus, as a result, not only is the prior art CA mechanism costly to implement (especially the PCMCIA solution), but it also precludes a customer from simultaneously accessing more CA services beyond the few that can be descrambled by the STB during any given period, even if additional programs are available from the service providers and the customer desires to purchase such PPV programs (e.g., to record several movies that are being broadcasted concurrently). Consequently, the flexibility with which a customer can purchase multiple CA services is greatly limited, since the customer's purchasing decision is constrained by the number of concurrent programs that the STB can support. At the same time, the potential revenue of the service providers is vastly limited because desired PPV purchases are often precluded by this technological limitation of the prior art STB. Therefore, it would be highly desirable to maximize the flexibility and parallel descrambling capability of the CA control by eliminating the inherent limitations of the card-based STB.

The advent of digital broadcast technology has enabled the use of a serial communication network for high speed and flexible interconnection of various devices and appliances within a network environment. The IEEE 1394 communication standard is a widely adopted serial communication network standard ("1394 network") in the art. For example, within a consumer household, personal computers (PCs), audio systems, STBs, TVs, video cassette recorders (VCRs) and other AV/C-compliant media devices can all be communicatively coupled together in a 1394 network. In such a network environment, the individual devices can interact with each other and facilitate the coordination of the different functionalities provided by the various devices.

With this technological backdrop, it has been proposed that the CA functionality for such a 1394 network be removed from the STBs (as is the case in the prior art STBs) and instead be implemented separately on the 1394 network. As such, the extraneous cost and limited descrambling capability problems inherent in the prior art, in which the CA functionality is built into the STBs, can potentially be resolved.

Nevertheless, an additional challenge exists with respect to the implementation of distributed CA functionality on a 1394 network. The problem posed relates to out-of-band (OOB) processing of digital broadcast signals. More particularly, within digital broadcast systems, some service providers deliver a scrambled broadcast signal (which encodes a CA service such as a PPV program) and its respective descrambling information in completely separate frequency ranges. Regular TV broadcast signals and the descrambling information for the regular broadcast signals (OOB data) are carried in separate frequency ranges. In this environment, not only is the prior art STB cost inefficient and limited in descrambling capability as described above, but its internal architecture is also ill-suited for simultaneous handling of the regular broadcast signal and the OOB data which are broadcasted in different frequencies. As such, the prior art STB design is not a viable option for implementing CA control on a 1394 network.

SUMMARY OF THE INVENTION

Accordingly, there exists a need for a method and apparatus for implementing distributed CA control on a 1394 network which does not incur extraneous costs for including unnecessary descrambling hardware in each STB. Further, there exists a need for a method and apparatus for implementing distributed CA control on a 1394 network which does not unduly restrict the capability of simultaneous multi-channel descrambling. Moreover, there exists a need for a method and apparatus for implementing distributed CA control on a 1394 network which supports OOB processing that is commonly employed in the digital broadcasting art. The present invention provides a method and apparatus for distributed conditional access control on a 1394 network which is highly cost efficient and does not indiscriminately include components that are non-essential for implementing the required functionality. The present invention further provides a method and apparatus for distributed conditional access control on a 1394 network that-enables the simultaneous descrambling of a large number of CA services, thereby affording optimal flexibility to the service subscriber. Moreover, the present invention provides a method and apparatus for distributed conditional access control on a 1394 network that fully supports OOB processing and optimizes bandwidth resources available on the 1394 network. These and other advantages of the present invention not specifically mentioned above will become clear within discussions of the present invention presented herein.

More specifically, embodiments of the present invention include a CA subsystem over a 1394 network, the CA subsystem comprising a receiver unit for receiving a digital broadcast signal (DBS) and OOB data from an external source (e.g., a service provider), where the DBS and OOB data are transmitted from the external source to the receiver unit in different broadcast frequencies. The receiver unit comprises a main tuner subunit coupled to receive the DBS, which can be encrypted with respect to a first encryption scheme. The receiver unit also comprises an OOB tuner subunit coupled to receive the OOB data for decrypting the DBS with respect to the first encryption scheme. The CA subsystem also comprises a CA control unit coupled to the receiver unit, which in turn comprises a CA subunit coupled to receive the DBS and OOB data. If the DBS is encrypted with respect to the first encryption scheme, the CA subunit generates a descrambled signal from the DBS using the OOB data, such that said descrambled signal is no longer encrypted with respect to the first encryption scheme.

Embodiments of the present invention include the above and wherein the descrambled signal is encrypted with respect to a standard 1394 copy protection scheme, but not encrypted with respect to the first encryption scheme.

Embodiments of the present invention further include the above and wherein the DBS and OOB data are transmitted over the 1394 network via two separate isochronous channels.

DETAILED DESCRIPTION OF THE INVENTION

In the following detailed description of the present invention, a method and apparatus for distributed conditional access control on a serial communication network, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Particularly, by separating the conditional access (CA) functionality into various nodes (e.g., CA control units 220, 220*a*, 220*b* and 220*c* in FIG. 2) on a serial communication network ("distributed CA control"), the present invention advantageously enables the design and manufacture of a simpler and thus less expensive receiver unit (e.g., receiver unit 210 in FIG. 2) than the prior art card-based STB. In addition, distributed CA control within the present invention also eliminates the physical limitation on the number of CA services that can be accessed at any given time which is inherent in the prior art. Thus, the user enjoys maximum flexibility in viewing and/or recording selections and service providers benefit from the increased subscription that results. Moreover, within the scope of the present invention, distributed CA control also enables common functionalities to be accessed in situations that does not require CA control (e.g., communication using modem device 240 of FIG. 2), thus allowing the user to amortize the cost of technology over many different uses. These and other advantages of the present invention not specifically enumerated above will become clear within discussions of the present invention below.

Figure 1:
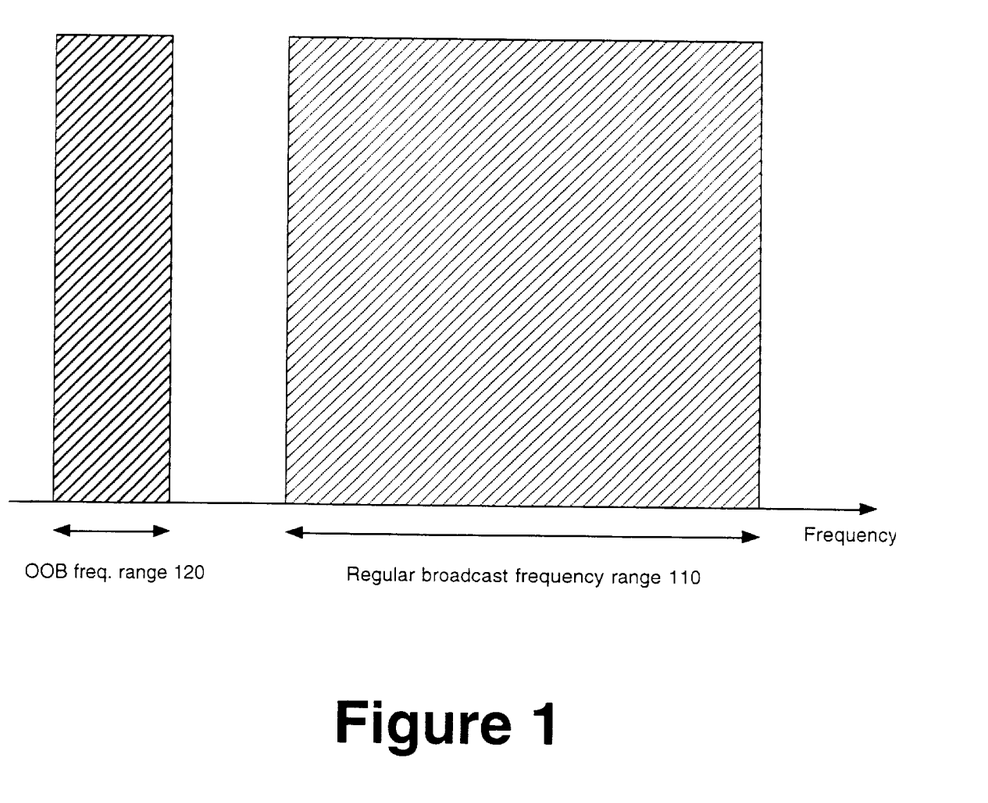
FIG. 1 illustrates exemplary frequency ranges of regular TV broadcast signals and associated OOB data employed in a digital broadcast system.

FIG. 1 illustrates exemplary frequency ranges of regular TV broadcast signals and associated OOB data employed in a digital broadcast system. As illustrated in FIG. 1, regular TV broadcast signals are carried in a regular broadcast frequency range 110, while the descrambling information for the regular broadcast signals (OOB data) is carried in an OOB frequency range 120 that is distinct from the regular broadcast frequency range 110.

Figure 2:
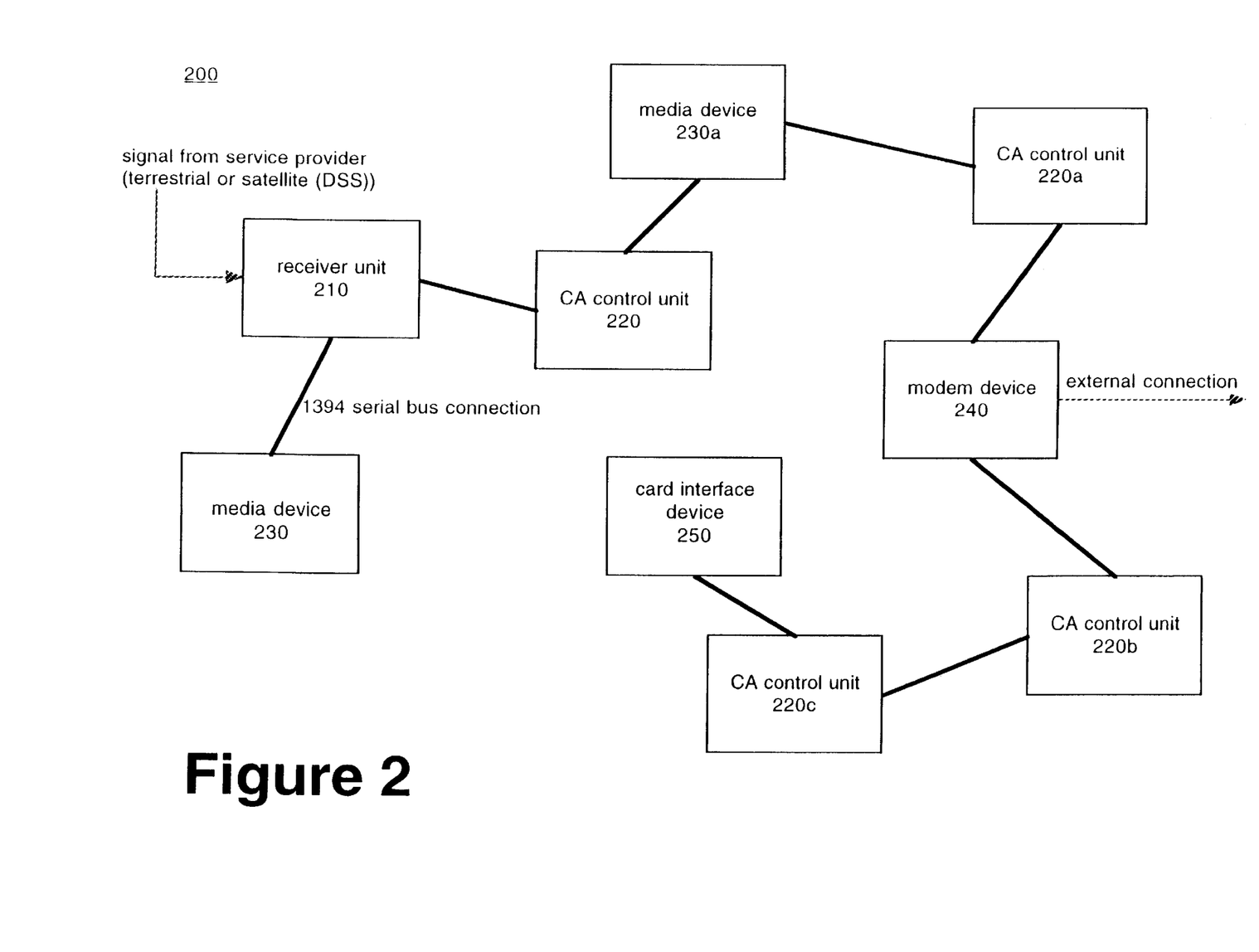
FIG. 2 illustrates an exemplary conditional access (CA) subsystem over a 1394 network within a digital broadcasting environment in accordance with one embodiment of the present invention.

FIG. 2 illustrates an exemplary conditional access (CA) subsystem 200 over an IEEE 1394 communication network within a digital broadcasting environment in accordance with one embodiment of the present invention. IEEE 1394 is a serial communication standard that is being widely adopted in the digital communication art because it offers superior performance and flexibility over other communication standards. In particular, a 1394 network within a consumer household provides high speed and flexible interconnection of various devices and appliances, such that the individual devices can interact with each other and facilitate the coordination of the different functionalities of the various devices. As shown in FIG. 2, in one embodiment, a receiver unit 210 is included in the CA subsystem of the present invention. Receiver unit 210 is the conduit between the 1394 network and the pertinent service provider(s) (e.g., terrestrial service, digital satellite service (DSS)) which furnish the programming contents. In particular, receiver unit 210 serves to receive a digital broadcast signal (DBS, also referred to as a digital multiplex) and, if the DBS is encrypted, the corresponding out-of-band (OOB) data.

Importantly, as discussed above with respect to FIG. 1, the encrypted DBS and its OOB data is delivered from the service provider(s) in completely separate frequency ranges. Receiver unit 210 is capable of receiving both the DBS and the OOB data simultaneously and making the two data streams (the scrambled DBS and the OOB data) available for further processing by the CA subsystem.

Furthermore, in accordance with the present invention, receiver unit 210 does not typically incorporate any descrambling capability or circuitry in and of itself. In one embodiment, receiver unit 210 has built-in support for AV/C (an industry standard audio-video command set) and 1394. Such 1394-AV/C support is desirable because it enables receiver unit 210 to control other AV/C media devices on the 1394 network. The present invention appreciates that this built-in 1394-AV/C support can be further utilized to implement distributed CA control by separating the authorization and descrambling of the DBS using the OOB data (CA functionality) from the reception of the signals (both the DBS and the OOB data). Accordingly, in various embodiments of the present invention, receiver unit 210 and one or more CA control units 220, 220a, 220b, 220c (described below) jointly implement the CA functionality within the CA subsystem, wherein receiver unit 210 receives the DBS and the OOB data and routes them over the network to CA control units 220, 220a, 220b and/or 220c which descramble the DBS using the OOB data after proper authorization.

More specifically, in one embodiment, receiver unit 210 performs (as a tuner) the reception of the DBS and the OOB data, and then routes the two data streams over to CA control unit 220 for any authorization and descrambling that may be required to generate the desired descrambled programming content. Thus, while receiver unit 210 and the prior art card-based STB both serve to receive broadcast signals from service providers, receiver unit 210 and the prior art are significantly distinct because the architecture of receiver unit 210 expressly eliminates the need for descrambling hardware, which is an essential component of the prior art card-based STB, from receiver unit 210. As such, descrambling components costs are not routinely incurred for every receiver unit 210, as is the case in the prior art. Consequently, the design of receiver unit 210 is greatly simplified and the manufacturing cost is greatly reduced.

Referring still to FIG. 2, optional media devices 230 and 230a are coupled to the 1394 network in accordance with one embodiment of the present invention. Media devices 230 and 230a can be any storage (e.g., disc storage), recording (e.g., VCR) or display unit (e.g., full digital TV, limited display on a PDA, text-only LCD screen). Numerous operating options for media devices 230 and 230a are supported within the scope of the present invention. For example, to view or record a live broadcast, the DBS and OOB data streams are received by receiver unit 210, descrambling is performed by CA control unit 220, and then the descrambled signal is sent to media device 230 for viewing and/or recording. As another example, to playback a prerecorded program, media device 230a can read the prerecorded media, send the recorded signal to CA control unit 220 for authorization and/or descrambling if necessary, and then media device 230 can display the program for viewing.

With reference still to FIG. 2, an optional modem device 240 is coupled to the 1394 network in accordance with one embodiment of the present invention. Modem device 240 enables two-way communications between the 1394 network and an external device to which modem device 240 is communicatively connected, thus providing an additional avenue for data exchange (downloading and uploading) between the 1394 network and other domains. In an exemplary embodiment, modem device 240 is used for the purchase of an impulse pay-per-view service, wherein modem device 240 sends a message to the service provider indicating the customer's decision to purchase the PPV service and allowing for billing. It is appreciated that various types of modem devices 240 can be used in accordance with the present invention. For instance, a PSTN/POTS type modem or a cable modem can be used as modem device 240.

Referring again to FIG. 2, an optional card interface device 250 is coupled to the 1394 network in accordance with one embodiment of the present invention. In conjunction with an appropriate smart card, card interface device 250 is capable of performing limited CA functionality as described above with respect to prior art STBs. Nevertheless, card interface device 250 can also be used to implement other specialized functions when special-purpose smart cards are provided. An exemplary embodiment involves using a smart card and card interface device 250 to provide electronic commerce capabilities to the 1394 network in accordance with the present invention.

Figure 3:
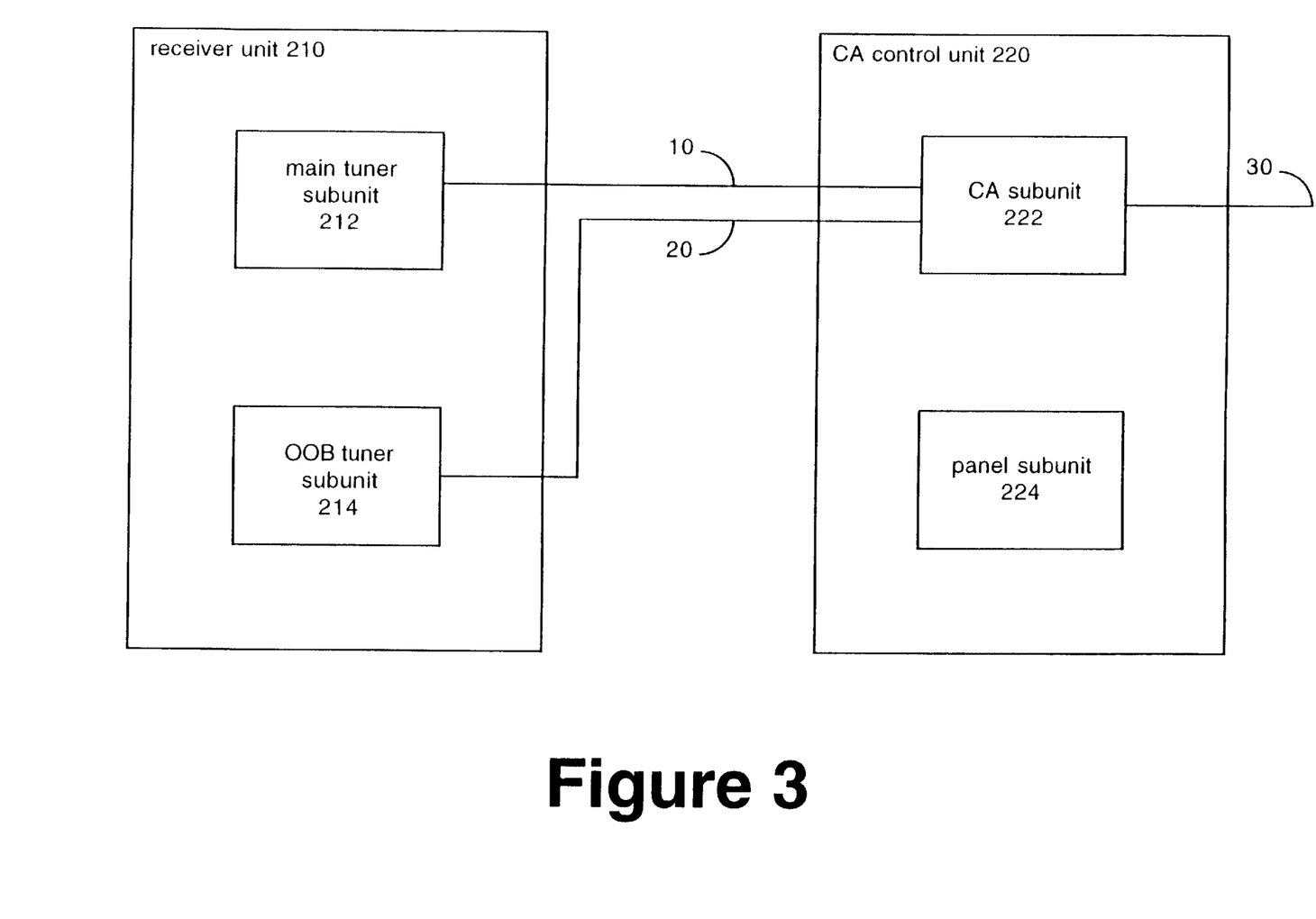
FIG. 3 illustrates the internal architecture of the receiver unit and the CA control unit of the CA subsystem and the routing of signals between the two units in accordance with one embodiment of the present invention.

Receiver unit 210 and CA control units 220, 220a, 220b, 220c are now described in greater detail with reference to FIG. 3 through FIG. 6. As discussed above, receiver unit 210 functions to receive the DBS and the OOB data from the service provider and route them over the network to CA control units 220, 220a, 220b and/or 220c. Upon receiving the DBS and the OOB data, CA control units 220, 220a, 220b and/or 220c perform any required authorization and then descramble the DBS using the OOB data. FIG. 3 illustrates the internal architecture of receiver unit 210 and CA control unit 220 of CA subsystem 200 and the routing of signals between the two units in accordance with one embodiment of the present invention. Referring to FIG. 3, receiver unit 210 comprises two subunits, namely, a main tuner subunit 212 and an OOB tuner subunit 214, in accordance with the present invention. In one embodiment, main tuner subunit 212 and OOB tuner subunit 214 each has built-in support for AV/C and 1394, such that receiver unit 210 can in turn support both AWC and 1394.

Furthermore, in this embodiment, each of tuner subunits 212 and 214 is an AV/C tuner subunit that is compliant with the 1394 Trade Association AV Working Group standard of April 1998. It is appreciated that present invention can be with any type of broadcast system. Exemplary embodiments can support DVB (European standard), ATSC (U.S. standard), analog video, analog audio and DAB. Thus, maximum flexibility and interoperability is ensured by adopting the standard AV/C tuner subunit in the architecture of this embodiment of the present invention.

Significantly, main tuner subunit 212 can be set to receive the DBS that represents main broadcast data (e.g., programming content) being delivered via a frequency within regular broadcast frequency range 110 of FIG. 1, while OOB tuner subunit 214 is dedicated to receive the OOB data being delivered via a frequency within OOB frequency range 120 of FIG. 1. In other words, tuner subunits 212 and 214 monitor and receive signals in different frequency ranges than each other. Working in conjunction, tuner subunits 212 and 214 enable receiver unit 210 to simultaneously handle the incoming DBS and OOB data, even though they are being transmitted via different frequencies. As such, receiver unit 210 overcomes a critical deficiency in the prior art STBs, namely, the inability to handle two signals or data streams being concurrently delivered via two separate frequencies.

Having received the DBS and the OOB data using main tuner subunit 212 and OOB tuner subunit 214, respectively, receiver unit 210 routes the two data streams to CA control unit 220, which comprises a CA subunit 222, for further processing. CA subunit 222 in turn comprises two destination (input) ports-one for receiving the DBS data and the other for receiving the OOB data-and one source (output) port for delivering descrambled content (yet still copy protected, as explained below) to other devices on the 1394 network. CA control unit 220 further comprises an optional panel subunit 224 (as disclosed in the co-pending application entitled "A Method and System for Providing a User Interface for a Networked Device Using Panel Subunit Descriptor Information" by Ludtke, et al.; Ser. No. 09/108, 265; filed Jul. 1, 1998) for providing on screen display (OSD) support for CA control unit 220. For example, panel subunit 224 enables on screen user interaction during payment authorization when a user selects a PPV program. Although support for PCMCIA within CA control unit 220 is not required in accordance with the present invention, such functionality may nevertheless be included to provide added compatibility within the scope of the present invention.

Figure 4:
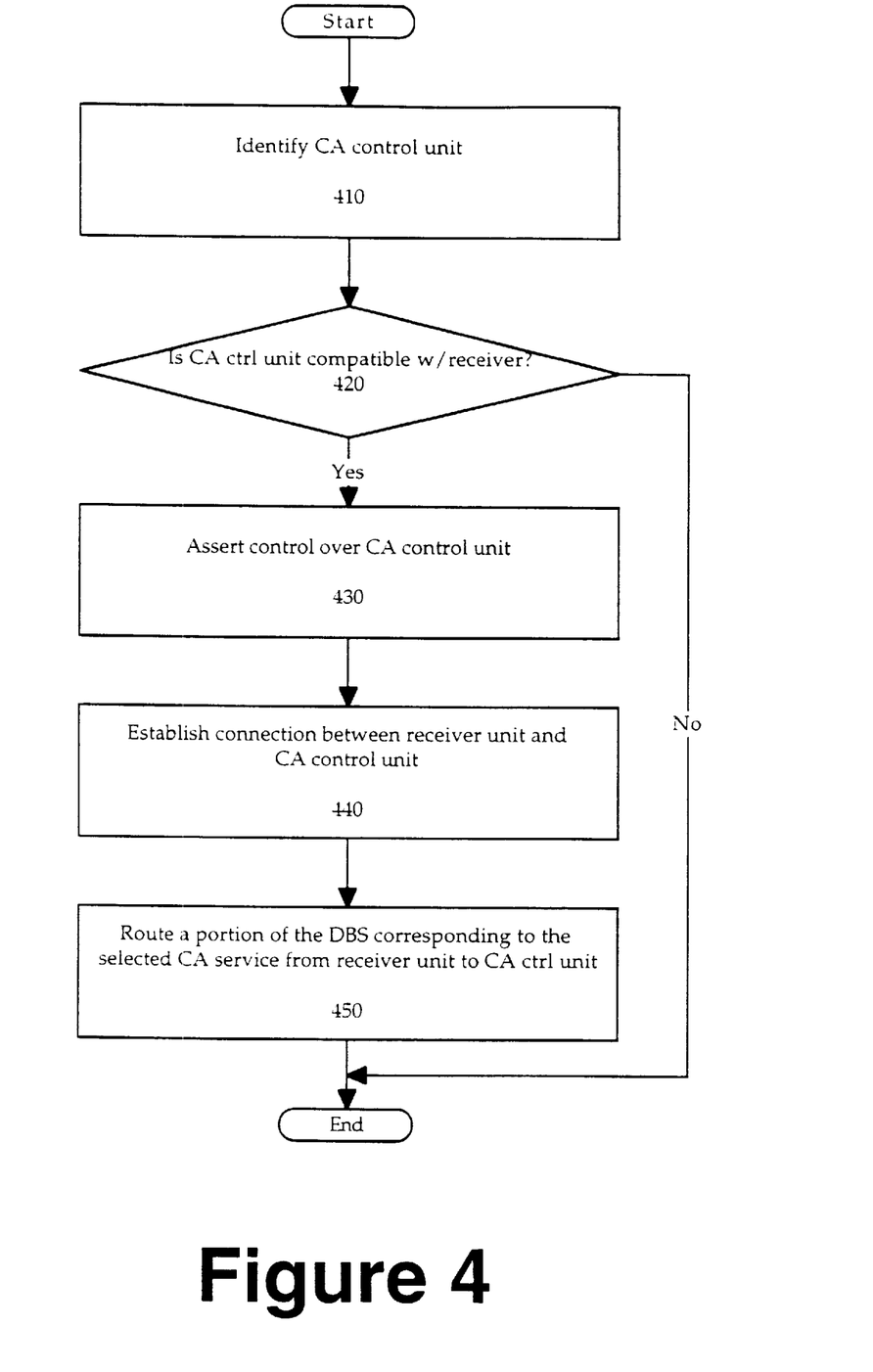
FIG. 4 is a flow diagram illustrating steps for routing the appropriate data from the receiver unit to the CA control unit in accordance with one embodiment of the present invention.

FIG. 4 is a flow diagram 400 illustrating the steps for routing the appropriate data from receiver unit 210 to CA control unit 220 in accordance with one embodiment of the present invention. In step 410, receiver unit 210 identifies CA control unit 220 on the 1394 network by examining the various nodes of the network.

In step 420, receiver unit 210 determines whether CA control unit 220 as identified in step 410 supports the particular broadcasting system employed by receiver unit 210. In one embodiment, receiver unit 210 examines the data structures used in CA subunit 222 of CA control unit 220 to determine if they match with the data structures used in main tuner subunit 212 and OOB tuner subunit 214 of receiver unit 210. If a match is established, receiver unit 210 concludes that CA control unit 220 and receiver unit 210 are compatible. As an example, different CA services as provided by different content providers (e.g., HBO, ShowTime) could employ different encryption formats or data structures, so that CA control unit 220 may not be compatible with a particular CA service (e.g., a PPV movie from HBO) received by receiver unit 210. In such cases, receiver unit 210 would proceed to identify another CA control unit on the network (e.g., CA control unit 220a) which can handle the particular CA service in question.

If it is determined in step 420 that CA control unit 220 as identified in step 410 is not compatible with receiver unit 210, process 400 terminates.

On the other hand, if it is determined in step 420 that CA control unit 220 is compatible with receiver unit 210, process 400 enters step 430 wherein receiver unit 210 asserts control over CA control unit 220. In one embodiment, receiver unit 210 issues a RESERVE command (as defined in AV/C) to CA subunit 222 of CA control unit 220 for establishing control of CA control unit 220.

In step 440 of FIG. 4, a logical communication connection is established between receiver unit 210 and CA control unit 220. In one embodiment, an isochronous channel 10 (FIG. 3) is allocated between main tuner subunit 212 and CA subunit 222 and another isochronous channel 20 (FIG. 3) is allocated between OOB tuner subunit 214 and CA subunit 222. As such, the two output data streams from main tuner subunit 212 and OOB tuner subunit 214 can be routed independently in isochronous channel 10 and isochronous channel 20, respectively. It is appreciated that the OOB data can travel via isochronous channel 20 in various isochronous transmission formats. One example is the Motion Picture Expert Group (MPEG) transport stream format, which is the format commonly used in regular broadcast. In this case, the OOB data is either broadcasted as an MPEG transport stream and thus can enter isochronous channel 20 without conversion, or the OOB data is broadcasted using a proprietary format and then converted into the MPEG transport stream format before entering isochronous channel 20. Alternatively, a proprietary isochronous transmission format can be used for OOB data traveling via isochronous channel 20. In this case, the proprietary format needs to be defined for each individual broadcast system.

In another embodiment, the two data streams from main tuner subunit 212 and OOB tuner subunit 214 are multiplexed into a single isochronous stream and then transmitted to CA subunit 222, wherein the isochronous stream is demultiplexed into the two data streams for further processing.

In view of the repetitive nature of certain OOB data (e.g., date information, program information), in yet another embodiment of the present invention, an asynchronous stream is used (instead of isochronous channel 20 as described above) for the transmission of OOB data from OOB tuner subunit 214 to CA subunit 222. It is appreciated that various asynchronous transmission formats can be used in this embodiment. Examples include: the asynchronous channel format being developed by PWG-C/1394 TA, the DPP format, the standard asynchronous stream format defined by IETF (Internet Engineering Task Force), an asynchronous packet format, and other proprietary asynchronous data transfer mechanisms.

In step 450 of FIG. 4, a selected portion of the DBS corresponding to the user's service selection is routed from receiver unit 210 to CA control unit 220. More specifically, in one embodiment, as the user scans or surfs the available services carried by the full DBS, receiver unit 210 identifies the particular service (e.g., a PPV movie) selected at a given time and performs a demultiplexing action on the DBS to separate out the portion of the DBS that corresponds to the selected service. The selected portion of the scrambled DBS is then routed from main tuner subunit 212 to CA subunit 222 via isochronous channel 10, while the OOB data is routed from OOB tuner subunit 214 to CA subunit 222 via isochronous channel 20.

In one embodiment, the OOB data is sent to CA subunit 222 continuously irrespective of whether the selected portion of the DBS being sent to CA subunit 222 is encrypted or not. In other words, the OOB data is transmitted even when the user is watching a free-to-air program and no descrambling is required of CA subunit 222. The constant flow of OOB data does not present a significant impact on the overall performance of the 1394 network since the OOB data is a low bandwidth signal (approximately 1.5 Mbs) relative to the bandwidth capability of the 1394 network (currently between 100 and 400 Mbs). In another embodiment, the sending of the OOB data is triggered by the sending of a scrambled signal. In other words, when the user selects a scrambled service and thus causes main tuner subunit 212 to send the scrambled signal to CA subunit 222, the user's selection also causes OOB tuner subunit 214 to send the OOB data to CA subunit 222. In contrast, when the user is accessing an unscrambled free-to-air program, only the selected unscrambled portion of the DBS, but not the OOB data, flows from receiver unit 210 to CA control unit 220.

It is appreciated that the AV/C tuner subunit model incorporates demultiplexing capability which can be advantageously utilized in the embodiment of the present invention as described above. Importantly, by demultiplexing the DBS and transmitting just the portion of the DBS that corresponds to the selected service over the 1394 network, rather than sending the full DBS or digital multiplex across the network, the instant embodiment of the present invention optimizes the bandwidth usage of the entire network.

It is also appreciated that within the scope of the present invention, the function of routing control can either be implemented within receiver unit 210 as described above, or be isolated from receiver unit 210 and implemented as a separate node or as part of another unit on the 1394 network. In such alternative embodiments, minor adjustments to process 400, as described above with reference to FIG. 4, would be no doubt clear to one skilled in the art.

Figure 5:
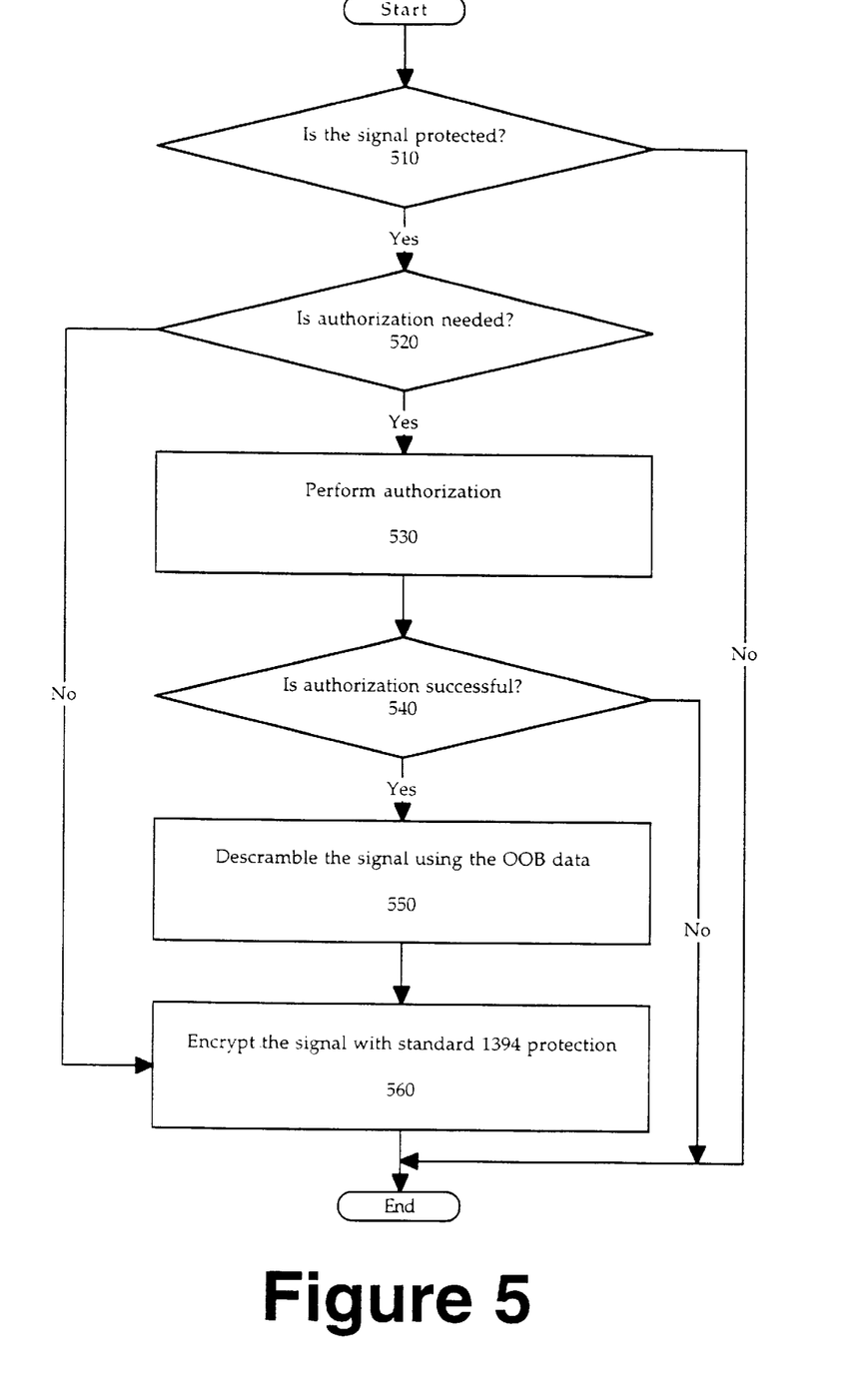
FIG. 5 is a flow diagram illustrating steps for performing authorization and descrambling as used by the CA subunit in accordance with one embodiment of the present invention.

Upon receiving the selected portion of the DBS and the OOB data as described above, CA subunit 222 performs the actual authorization and the descrambling of the DBS as appropriate. FIG. 5 is a flow diagram 500 illustrating the steps for performing authorization and descrambling as used by CA subunit 222 in accordance with one embodiment of the present invention. In step 510, CA subunit 222 determines whether the selected portion of the DBS is scrambled or not.

If it is determined in step 510 that the selected portion of the DBS is not scrambled, such as when the consumer is tuned to a free-to-air program, no descrambling is necessary and process 500 terminates.

If it is determined in step 510 that the selected portion of the DBS is scrambled, process 500 proceeds to step 520, wherein CA subunit 222 determines whether authorization is necessary for the programming content. For instance, if the DBS represents an impulse purchase of a PPV movie, authorization for payment is required before the movie can be made available to the user for viewing and/or recording. In this case, modem device 240 (FIG. 2) may be required to act as an authorization channel with the service provider to facilitate billing. Likewise, if the DBS represents scrambled "premium" services such as HBO and ShowTime, authorization is needed even though such premium services may be part of the standard subscription package that the user pays for on a monthly basis. There is a need for authorization in this case because other premium services which are not part of the user's subscription package may also exist in the DBS. However, if the DBS represents non-premium programming content which is part of the user's standard viewing subscription or a free-to-air broadcast, then no authorization is required. As another example, the user may have specified access restrictions for certain programs, so that an access code or a password is required to gain access to those programs. In this case, authorization (code or password verification) is necessary.

If it is determined in step 520 that no authorization is necessary, then process 500 simply proceeds to step 550.

On the other hand, if it is determined in step 520 that authorization is necessary, process 500 proceeds to step 530, wherein CA subunit 222 performs the requisite user authorization. In one embodiment, CA subunit 222 initiates an interaction with the user (e.g., via on screen display and selection) to accomplish the task. Process 500 then moves on to step 540.

In step 540, process 500 determines whether the authorization performed in step 530 was successful or not. If it is determined in step 540 that the authorization of step 530 was unsuccessful (e.g., user cancellation, payment denied), then no descrambling is performed and process 500 terminates. If it is determined in step 540 that the authorization of step 530 was successful, process 500 enters step 550, wherein CA subunit 222 uses the OOB data to descramble the encrypted DBS, and then moves on to step 560. In step 560, CA subunit 222 encrypts the signal generated using the OOB data with the standard 1394 copy protection scheme. Process 500 terminates thereafter.

As is well known in the digital broadcasting art, the designated digital interface for audio visual (AV) content is 1394-compliant, and a standard protection scheme for AV content on a 1394 network has been devised. For the protection of AV content against illicit copying within a consumer's in-home 1394 network, this standard 1394 copy protection scheme is used to encrypt the AV content that is flowing within the in-home network, such as when the DBS is being transmitted from CA control unit 220 to a display device like a TV. In other words, even within the home network environment, there is no "clear", or entirely unencrypted, data stream flowing over the wire of the 1394 network unless the content is that of free-to-air programs. Thus, to implement this protection mechanism, the dual role of CA control unit 220 involves descrambling the private or proprietary encryption used to protect the DBS during its delivery from the service provider to the consumer's household, and then encrypting the resulting signal with the standard 1394 copy protection scheme before making the content data available to other devices on the network via isochronous channel 30.

Furthermore, in one embodiment, CA control unit 220 interacts with the intended destination(s), such as media devices 230 and 230a as illustrated in FIG. 2, to verify that the device(s) are authorized to receive the programming content before the copy-protected signal is routed to the device(s) in question. Additional protection against unauthorized viewing and/or recording is thereby afforded.

Figure 6:
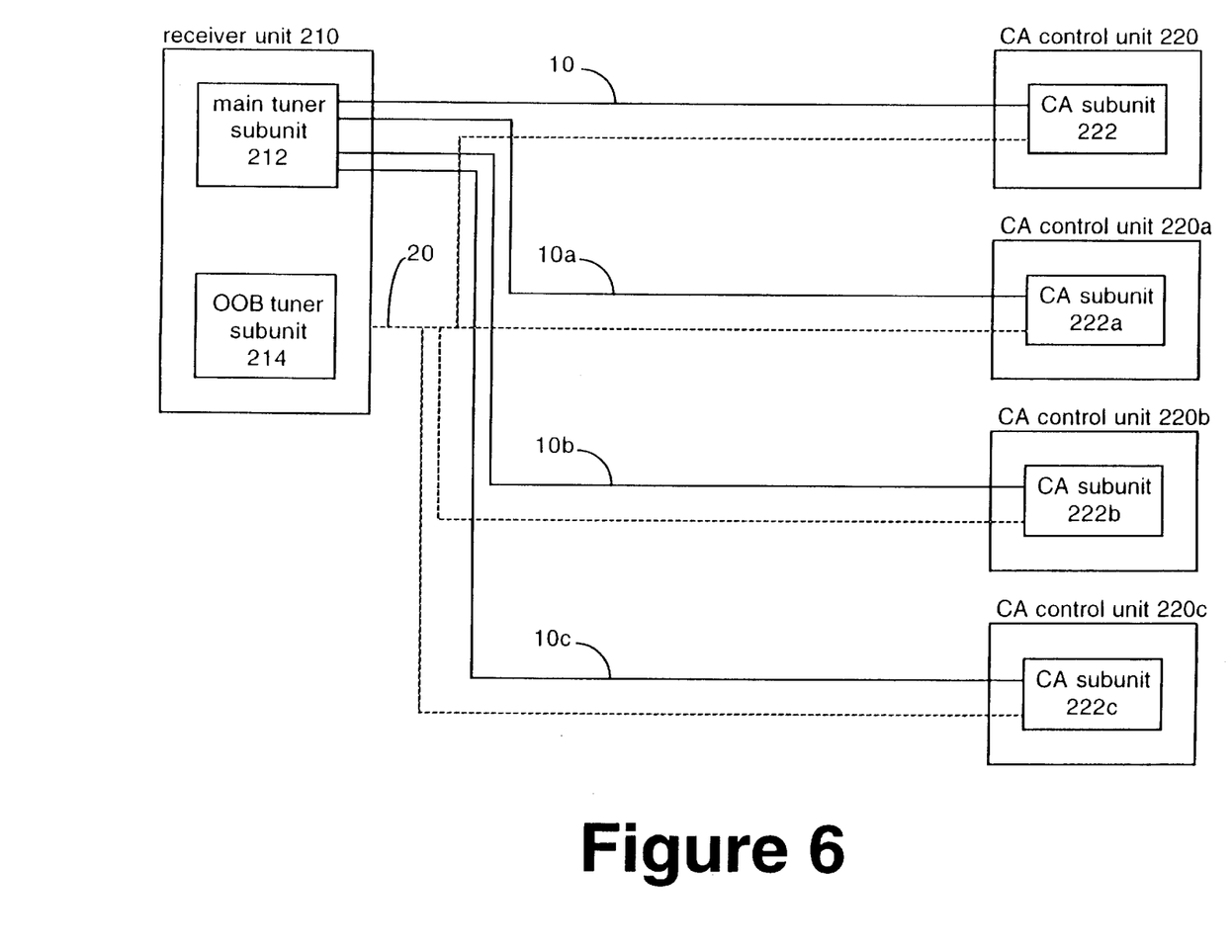
FIG. 6 illustrates the routing of signals between the receiver unit and multiple CA control units of the CA subsystem in accordance with one embodiment of the present invention.

FIG. 6 illustrates the routing of signals between receiver unit 210 and multiple CA control units 220, 220a, 220b and 220c of the CA subsystem in accordance with one embodiment of the present invention. With reference to FIG. 6, each of CA control units 220, 220a, 220b and 220c has its own CA subunit, namely, CA subunits 222, 222a, 222b and 222c, respectively. It is appreciated that CA subunits 222a, 222b and 222c share the same attributes with CA subunit 222 as described above with reference to FIG. 3. In this embodiment, the user can simultaneously have access to multiple CA services if the user so desires. More particularly, the user selects the various CA services through different devices on the 1394 network (e.g., media devices 230 and 230a as illustrated in FIG. 2) and, using its demultiplexing capability as described above, main tuner subunit 212 identifies the relevant portions of the DBS corresponding to the selected services and delivers the demultiplexed content data streams to CA subunits 222, 222a, 222b and 222c via four separate isochronous channels 10, 10a, 10b and 10c, respectively. Meanwhile, OOB tuner subunit 214 provides a single output stream of OOB data which is routed to CA subunits 222, 222a, 222b and 222c via the single isochronous channel 20.

Importantly, by making available a single OOB data stream to be used by the several CA subunits 222, 222a, 222b and 222c, bandwidth usage of the 1394 network is optimized because the OOB data is not duplicated for each of the content data streams. Indeed, the single OOB data stream flowing via isochronous channel 20 can be furnished to the CA subunit of any CA control unit on the 1394 network and can be used to descramble any CA services carried by the full DBS. As would be clear to one skilled in the art, within the scope of the present invention, the instant embodiment can be expanded to include even more CA control units, so that an even greater number of CA services can be simultaneously accessed, subject only to the physical limitation of the maximum allowable number of nodes and channels on a 1394 network. Currently, up to 64 nodes (devices) and 64 isochronous channels are allowed on a 1394 network. Nevertheless, one of the 64 isochronous channels is dedicated to "broadcast", such that all data transmitted in the broadcast channel is visible to all nodes. As a result, 63 "private" (non-broadcast) channels are available for general purpose use, meaning that 63 different CA services can potentially be accessed concurrently. As such, the present invention advantageously eliminates the restrictive limitation inherent in the prior art that the user can only access a few (typically with a maximum of 4) CA services at any given time, and provides the user maximum flexibility in fashioning the user's viewing and recording schedules.

Although the foregoing embodiments of the present invention are described with respect to an AV/C environment, it is appreciated that other embodiments are well suited for use in a HAVi (Home Audio/Video Interoperability) environment. In particular, in such alternative embodiments, the various AV/C units (e.g., receiver unit 210, CA control unit 220) and subunits (e.g., main tuner subunit 212, OOB tuner subunit 214, CA subunit 222, panel subunit 224) described above can be substituted with equivalent HAVi device control modules (DCMs) and functional control modules (FCMs) having the same architecture as disclosed for the AV/C counterparts, such that these embodiments provide a distributed 1394-HAVi CA subsystem. Furthermore, within the scope of the present invention, other embodiments can be realized in any device modeling/control protocol. Such protocols include, but are not limited to, Home Plug 'n Play, HAPI, DPP device/function modeling and CAL.

The preferred embodiment of the present invention, a method and apparatus for distributed conditional access control on a serial communication network, is thus described. While the present invention has been described in particular embodiments, it should be appreciated that the present invention should not be construed as limited by such embodiments, but rather construed according to the below claims.

What is claimed is:

1. A communication network comprising:
  a) a receiver unit configured to receive information from a service provider and coupled to a serial communication network, said receiver unit comprising:
    a1) a first tuner configured to generate a first digital signal encoded under a first encryption format;
    a2) a second tuner configured to generate out-of-band (OOB) data, wherein said first digital signal and said OOB data are transmitted on said serial communication network; and
  b) a first conditional access (CA) unit coupled to said serial communication network configured to receive said first digital signal and said OOB data, said first CA unit configured to generate a first decrypted digital signal (DDS) based on said OOB data and said first encryption format, said first CA unit also configured to transmit said first DDS over said serial communication network.

2. The communication network as recited in claim 1 wherein said serial communication network is based on a version of the IEEE 1394 communication standard.

3. The communication network as recited in claim 1 wherein said first DDS is copy protected under a copy protection format wherein said copy protection format is different from said first encryption format.

4. The communication network as recited in claim 1 wherein said first digital signal is transmitted from said first tuner on said serial communication network to said first CA unit via a first isochronous channel, and said OOB data is transmitted from said second tuner on said serial communication network to said first CA unit via a second isochronous channel.

5. The communication network as recited in claim 1 wherein said first tuner is also configured to generate a second digital signal encoded under a second encryption format and further comprising a second CA unit coupled to said serial communication network to receive said OOB data and said second digital signal, said second CA unit configured to generate a second DDS based on said OOB data and said second encryption format, said second CA unit also configured to transmit said second DDS over said serial communication network.

6. The communication network as recited in claim 1 wherein said first DDS is copy protected under a copy protection format and further comprising a media device coupled to said serial communication network, said media device configured to apply said copy protection format to said first DDS to generate an unscrambled digital signal for viewing.

7. The communication network as recited in claim 1 wherein said first CA unit further comprises a panel subunit configured to provide on screen display (OSD) support for said first CA unit.

8. The communication network as recited in claim 1 further comprising a modem device configured to perform two-way communications between said serial communication network and an external device.

9. A communication network comprising:
  a) signal reception means for receiving information from a service provider and coupled to a serial communication network, said signal reception means comprising:
    a1) first tuning means for generating a first digital signal encoded under a first encryption format;
    a2) second tuning means for generating out-of-band (OOB) data, wherein said first digital signal and said OOB data are transmitted on said serial communication network; and
  b) first control means coupled to said serial communication network to receive said first digital signal and said OOB data, said first control means for generating a first decrypted digital signal (DDS) based on said OOB data and said first encryption format, said first control means also for transmitting said first DDS over said serial communication network.

10. The communication network as recited in claim 9 wherein said serial communication network is based on a version of the IEEE 1394 communication standard.

11. The communication network as recited in claim 9 wherein said first DDS is copy protected under a copy protection format wherein said copy protection format is different from said first encryption format.

12. The communication network as recited in claim 9 wherein said first digital signal is transmitted from said first tuning means on said serial communication network to said first control means via a first isochronous channel, and said OOB data is transmitted from said second tuning means on said serial communication network to said first control means via a second isochronous channel.

13. The communication network as recited in claim 9 wherein said first tuning means is also for generating a second digital signal encoded under a second encryption format and further comprising second control means coupled to said serial communication network to receive said OOB data and said second digital signal, said second control means for generating a second DDS based on said OOB data and said second encryption format, said second control means also for transmitting said second DDS over said serial communication network.

14. The communication network as recited in claim 9 wherein said first DDS is copy protected under a copy protection format and further comprising media means coupled to said serial communication network, said media means for applying said copy protection format to said first DDS to generate an unscrambled digital signal for viewing.

15. The communication network as recited in claim 9 wherein said first control means further comprises display interface means for providing on screen display (OSD) support for said first control means.

16. The communication network as recited in claim 9 further comprising communication means for performing two-way communications between said serial communication network and an external device.

17. In a digital broadcasting environment, a method for implementing distributed conditional access (CA) over a serial communication network, said method comprising the steps of:
   a) receiving information from a service provider using a receiver coupled to said serial communication network, said information being broadcasted in two different frequencies;
   b) generating a first digital signal encoded under a first encryption format and out-of-band (OOB) data from said information using said receiver;
   c) transmitting said first digital signal and said OOB data from said receiver over said serial communication network to a first control device, said first control device being a different network node than said receiver;
   d) generating a first decrypted digital signal (DDS) from said first digital signal and said OOB data using said first control device, such that said first DDS is not encrypted under said first encryption format; and
   e) transmitting said first DDS over said serial communication network to a first media device for rendering thereon.

18. The method as recited in claim 17 wherein said serial communication network is based on a version of the IEEE 1394 communication standard.

19. The method as recited in claim 17 further comprising the step f) of copy protecting said first DDS under a copy protection format wherein said copy protection format is different from said first encryption format.

20. The method as recited in claim 17 further comprising the steps of:
   g) generating a second digital signal encoded under a second encryption format using said receiver;
   h) transmitting said second digital signal from said receiver over said serial communication network to a second control device, said second control device being a different network node than said receiver and said first control device;
   i) generating a second DDS from said second digital signal and said OOB data using said second control device, such that said second DDS is not encrypted under said second encryption format; and
   j) transmitting said second DDS over said serial communication network to a second media device for rendering thereon.

21. A communication network comprising:
   a) a first receiver decoder device configured to receive information from a service provider and coupled to a serial communication network, said first receiver decoder device also configured to generate a first digital signal encoded under a first encryption format;
   b) a second receiver decoder device configured to receive information from a service provider and coupled to a serial communication network, said second receiver decoder device also configured to generate out-of-band (OOB) data, wherein said first digital signal and said OOB data are transmitted on said serial communication network; and
   c) a first conditional access (CA) unit coupled to said serial communication network configured to receive said first digital signal and said OOB data, said first CA unit configured to generate a first decrypted digital signal (DDS) based on said OOB data and said first encryption format, said first CA unit also configured to transmit said first DDS over said serial communication network.

22. The communication network as recited in claim 21 wherein said serial communication network is based on a version of the IEEE 1394 communication standard.

23. The communication network as recited in claim 21 wherein said first DDS is copy protected under a copy protection format wherein said copy protection format is different from said first encryption format.

24. The communication network as recited in claim 21 wherein said first digital signal is transmitted from said first receiver decoder device on said serial communication network to said first CA unit via a first isochronous channel, and said OOB data is transmitted from said second receiver decoder device on said serial communication network to said first CA unit via a second isochronous channel.

25. The communication network as recited in claim 21 wherein said first digital signal is transmitted from said first receiver decoder device on said serial communication network to said first CA unit via a first asynchronous channel, and said OOB data is transmitted from said second receiver decoder device on said serial communication network to said first CA unit via a second asynchronous channel.

26. The communication network as recited in claim 21 wherein said first receiver decoder device is also configured to generate a second digital signal encoded under a second encryption format and further comprising a second CA unit coupled to said serial communication network to receive said OOB data and said second digital signal, said second CA unit configured to generate a second DDS based on said OOB data and said second encryption format, said second CA unit also configured to transmit said second DDS over said serial communication network.

27. The communication network as recited in claim 21 wherein said first DDS is copy protected under a copy protection format and further comprising a media device coupled to said serial communication network, said media device configured to apply said copy protection format to said first DDS to generate an unscrambled digital signal for viewing.

28. The communication network as recited in claim 21 wherein said first CA unit further comprises a panel subunit configured to provide on screen display (OSD) support for said first CA unit.

29. The communication network as recited in claim 21 further comprising a modem device configured to perform two-way communications between said serial communication network and an external device.

30. The communication network as recited in claim 21 wherein said first digital signal and said OOB data are first combined into a single stream before they are received by said CA unit and wherein said CA unit is configured to demultiplex said single stream.

31. The communication network as recited in claim 1 wherein said first CA unit comprises a first input to receive said first digital signal and a second input to receive said OOB data.

32. The communication network as recited in claim 9 wherein said first control means comprises a first input means for receiving said first digital signal and a second input means for receiving said OOB data.

* * * * *